UNITED STATES PATENT OFFICE.

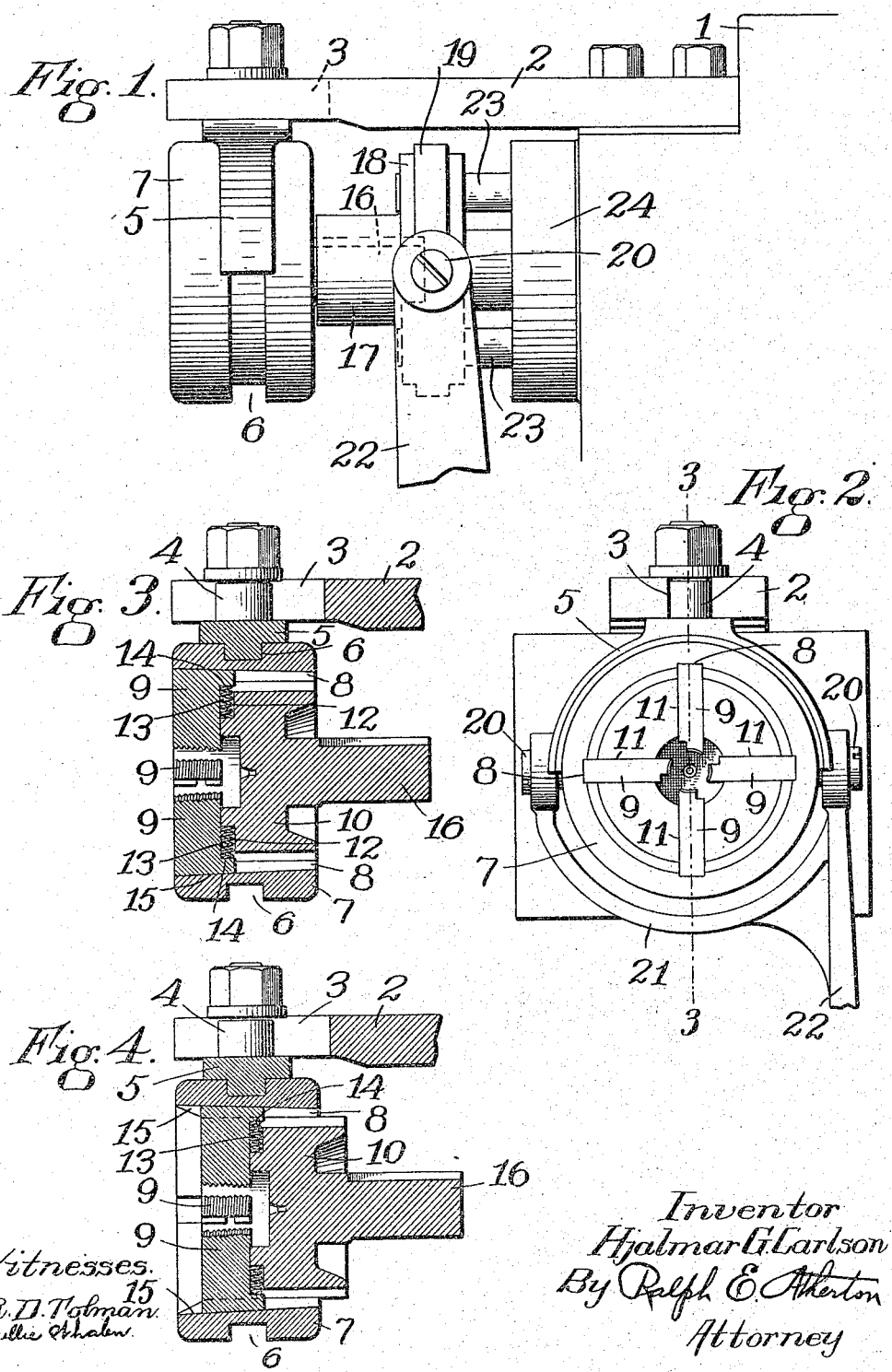

HJALMAR G. CARLSON, OF WORCESTER, MASSACHUSETTS, ASSIGNOR TO ROCKWOOD SPRINKLER COMPANY OF MASSACHUSETTS, OF WORCESTER, MASSACHUSETTS, A CORPORATION OF MASSACHUSETTS.

SCREW-THREADING DIE.

1,190,375. Specification of Letters Patent. Patented July 11, 1916.

Application filed December 9, 1912. Serial No. 735,600.

*To all whom it may concern:*

Be it known that I, HJALMAR G. CARLSON, a citizen of the United States, residing at Worcester, in the county of Worcester and Commonwealth of Massachusetts, have invented a new and useful Improvement in Screw-Threading Dies, of which the following is a specification, accompanied by drawings forming a part of the same.

My present invention relates to a screw threading die adapted to cut a screwthread upon a tapering surface, and it has for its object to provide a die by which such threads may be cut without leaving any abrupt shoulders or projections upon the screwthreads when the rotation of the die is stopped.

It also has for its object to distribute the cutting strain more uniformly throughout the entire operation of the die, thereby rendering the work accomplished more smooth and perfect, and increasing the durability of the cutting tools.

I accomplish these objects, among others, by the construction and arrangement of parts as hereinafter described, the novel features being pointed out in the annexed claim.

Referring to the accompanying drawings, Figure 1 is a side elevation of a screwthread cutting die embodying my invention. Fig. 2 is a front view. Fig. 3 is a central, sectional view showing the position of the cutting tools at the end of the threading operation. Fig. 4 is a central sectional view showing the position of the cutting tools at the beginning of the threading operation.

Similar reference figures refer to similar parts in the different views.

Referring to the drawings, 1 denotes a stationary framework of the machine in which is mounted suitable mechanism, not shown, for rotating the head carrying the screw threading tools. Attached to the framework 1 is a stationary bar 2 having its free end provided with a slot 3 in which is held the shank 4 of a fork 5 engaging an annular groove 6 in a cylindrical casing 7, provided on its inner surface with longitudinal grooves forming ways 8 which are engaged by the outer ends of the screw threading tools 9, in the present instance four in number, which are held in a rotating head 10, provided in its front face with radial ways 11. The head 10 is recessed at 12 behind each of the screw threading tools 9, and in these recesses 12 are placed spiral compression springs 13 with their force exerted between the bottoms of the recesses and overhanging shoulders 14 on the screw threading tools. The force of the springs 13 serves to hold the screw threading tools expanded in their radial ways 11, so that their outer ends will engage the longitudinal ways 8 in the casing 7. The bottoms of the longitudinal ways 8 are tapered, making their outer ends 15 deeper than their inner ends, so that as the screw threading tools 9 are forced outward, from the position shown in Fig. 4 to that shown in Fig. 3, they will be gradually expanded by the force of the springs 13, and will be contracted as they are moved inward, from the position shown in Fig. 3 to that shown in Fig. 4.

The amount of contraction given to the screw threading dies can be varied by moving the cylindrical casing 7 outward or inward by adjusting the fork 5 in the slotted end of the bar 2. The head 10 carrying the screw threading tools 9 is formed on the end of a spindle 16 connected by a spline with a hub 17 of a disk 18. The disk 18 is provided with a peripheral groove in which is inserted a ring 19, provided on its opposite sides with gudgeons 20, 20 journaled in a yoke 21 which is attached to the end of a swinging arm 22. The disk 18 has holes on diametrically opposite sides to receive pins 23, 23 projecting from a rotating disk 24 to which rotary motion is given by the operating parts of the machine, not shown. The disk 18 is capable of sliding on the pins 23 and a sliding motion is given to the disk 18 by means of the swinging arm 22 which is operated by the attendant.

By the above described construction, both a rotary and a sliding movement may be imparted to the head 10, causing the threaded ends of the tools 9, 9 to engage the work and cut a screwthread thereon. As the screw threading tools 9, 9 are advanced outwardly, they are expanded, thereby enlarging the diameter of the screwthread, forming a tapered thread.

I claim,

In a device of the character described, the combination with a tool carrying head, means for rotating said head, means for moving said head longitudinally, during its rotative movement, with respect to the work operated upon, thread cutting tools carried radially in said head and capable of radial movement therein, a casing inclosing said head and provided with interior longitudinal tapering ways to receive the ends of said tools, and means for fixing said casing in various positions of longitudinal adjustment relative to said head, whereby the longitudinal movement of said head causes radial movement of said tools therein.

Dated this fourth day of December 1912.

HJALMAR G. CARLSON.

Witnesses:
PENELOPE COMBERBACH,
NELLIE WHALEN.